(12) United States Patent
Kim et al.

(10) Patent No.: US 12,090,816 B2
(45) Date of Patent: Sep. 17, 2024

(54) HEAT PUMP SYSTEM FOR VEHICLE

(71) Applicants: HYUNDAI MOTOR COMPANY, Seoul (KR); KIA CORPORATION, Seoul (KR)

(72) Inventors: Jae Yeon Kim, Hwaseong-si (KR); Wan Je Cho, Hwaseong-si (KR); Heung Seok Seo, Yongin-si (KR); Seong Bin Jeong, Hwaseong-si (KR); Yeonho Kim, Seoul (KR); Jeawan Kim, Gwangmyeong-si (KR); Sangmoon Cho, Anyang-si (KR); SeungRyeol Lee, Hwaseong-si (KR); Jieun Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/514,375

(22) Filed: Oct. 29, 2021

(65) Prior Publication Data

US 2022/0355650 A1 Nov. 10, 2022

(30) Foreign Application Priority Data

May 4, 2021 (KR) ........................ 10-2021-0057606

(51) Int. Cl.
*B60H 1/32* (2006.01)
*B60H 1/00* (2006.01)

(52) U.S. Cl.
CPC ....... *B60H 1/3205* (2013.01); *B60H 1/00278* (2013.01); *B60H 1/00328* (2013.01); *B60H 1/00385* (2013.01)

(58) Field of Classification Search
CPC .............. B60H 1/3205; B60H 1/00278; B60H 1/00328; B60H 1/00385;
(Continued)

(56) References Cited

U.S. PATENT DOCUMENTS 10,717,337 B2 * 7/2020 Kim ........................ B60L 58/24
10,814,692 B2 * 10/2020 Kim ...................... B60H 1/3223
(Continued)

FOREIGN PATENT DOCUMENTS

EP 3260319 A1 * 12/2017 ......... B60H 1/00278
KR 10-2019-0033115 A 3/2019
(Continued)

*Primary Examiner* — Ljiljana V. Ciric
(74) *Attorney, Agent, or Firm* — MCDONNELL BOEHNEN HULBERT & BERGHOFF LLP

(57) ABSTRACT

A heat pump system for a vehicle includes a cooling apparatus configured to circulate a coolant in a coolant line to cool at least one electrical component provided in the coolant line, a battery cooling apparatus configured to circulate the coolant in the battery module, a heating apparatus configured to heat a vehicle interior by using the coolant, and a chiller configured to adjust a temperature of the coolant by heat-exchanging the coolant with a refrigerant, wherein the chiller is connected to the chiller connection line through a third valve provided in the coolant line between the radiator and the second valve, and the reservoir tank is provided in the coolant line between the radiator and the second valve, and is connected to the supply line connecting a first valve and a first water pump through a supply line.

19 Claims, 6 Drawing Sheets

(58) Field of Classification Search
CPC ...... B60H 2001/00307; B60H 1/32284; B60H 2001/00928; B60H 1/00921; B60H 1/00342; B60H 1/143; B60H 1/3213; B60H 1/32281; B60H 1/323; B60H 2001/3285

See application file for complete search history.

(56) References Cited

U.S. PATENT DOCUMENTS

| | | | |
|---|---|---|---|
| 10,974,566 B2* | 4/2021 | Kim | B60H 1/00278 |
| 11,318,816 B2* | 5/2022 | Kim | B60H 1/32281 |
| 11,479,076 B2* | 10/2022 | Kim | B60H 1/00485 |
| 11,479,077 B2* | 10/2022 | Kim | B60H 1/32284 |
| 11,505,034 B2* | 11/2022 | Kim | B60H 1/00278 |
| 11,529,844 B2* | 12/2022 | Kim | B60H 1/00885 |
| 11,571,948 B2* | 2/2023 | Kim | B60H 1/32284 |
| 11,602,977 B2* | 3/2023 | Kim | B60H 1/3227 |
| 11,794,550 B2* | 10/2023 | Kim | B60H 1/143 |
| 11,904,656 B2* | 2/2024 | Jo | B60H 1/3222 |
| 2020/0338950 A1* | 10/2020 | Kim | B60H 1/00921 |
| 2021/0129627 A1* | 5/2021 | Kim | B60H 1/00278 |
| 2022/0048359 A1* | 2/2022 | Kim | B60H 1/00921 |
| 2022/0355650 A1* | 11/2022 | Kim | B60H 1/00328 |
| 2022/0379681 A1* | 12/2022 | Kim | B60H 1/00485 |
| 2024/0010046 A1* | 1/2024 | Kim | B60H 1/3223 |

FOREIGN PATENT DOCUMENTS

| | | |
|---|---|---|
| KR | 10-2019-0132733 A | 11/2019 |
| KR | 10-2020-0063382 A | 6/2020 |
| KR | 10-2020-0134039 A | 12/2020 |

\* cited by examiner

HEAT PUMP SYSTEM FOR VEHICLE

CROSS-REFERENCE TO RELATED APPLICATION

This application claims priority to Korean Patent Application No. 10-2021-0057606, filed in the Korean Intellectual Property Office on May 4, 2021, the entire contents of which are incorporated herein by reference.

BACKGROUND

(a) Field

The present disclosure relates to a vehicle heat pump system for a vehicle, and more particularly, to a heat pump system for a vehicle, which adjusts a temperature of a battery module by using a single chiller in which a refrigerant and a coolant exchange heat, and improves heating efficiency by using various heat sources in a heating mode of the vehicle.

(b) Description of the Related Art

In general, an air conditioning apparatus for a vehicle includes an air conditioner system for circulating a coolant or a refrigerant to heat or cool an interior of the vehicle.

Such an air conditioner apparatus, which can maintain a fresh indoor condition by maintaining an indoor temperature of a vehicle at an appropriate temperature regardless of an outdoor temperature change, is configured to heat or cool an interior of the vehicle by heat-exchange by an evaporator during a process in which a refrigerant discharged by driving a compressor is circulated to the compressor again by passing through a condenser, a receiver drier, an expansion valve, and the evaporator.

That is, in the air conditioner apparatus, a high-temperature and high-pressure gaseous refrigerant that is compressed by the compressor is condensed through the condenser, then is evaporated by the evaporator through the receiver drier and the expansion valve to lower the indoor temperature and humidity in a summer cooling mode.

Recently, as a concern about energy efficiency and environmental pollution has gradually increased, development of an environmentally-friendly vehicle capable of being substantially substituted for a vehicle having an internal combustion engine has been required, and the environmentally-friendly vehicles are typically classified into an electric vehicle which is typically driven using a fuel cell or electricity as a power source, and a hybrid vehicle which is driven using an engine and an electric battery.

In the electric vehicle and the hybrid vehicle of the environmentally-friendly vehicles, a separate heater is not used, unlike an air conditioner of a general vehicle, and an air conditioner, which is applied to the environmentally-friendly vehicle, is typically referred to as a heat pump system.

In a case of the electric vehicle using the fuel cell, chemical reaction energy of oxygen and hydrogen is converted into electrical energy to generate driving force, and during this process, heat energy is generated by chemical reaction in the fuel cell, and as a result, effective removal of the generated heat is required to secure the performance of the fuel cell.

Even in the hybrid vehicle, the driving force is generated by driving the motor by using electricity supplied from the fuel cell or the electric battery together with the engine that is actuated with a general fuel, and as a result, the performance of the motor can be secured only by effectively removing the heat generated from the fuel cell or the battery, and the motor.

Accordingly, in a conventional hybrid vehicle or electric vehicle, a battery cooling system, a cooling means, and a heat pump system should be configured to have respective separate circuits to prevent heat generation of a motor, an electrical component, and a battery including a fuel cell.

Thus, the size and a weight of a cooling module disposed in the front of the vehicle are increased, and the layout of connecting pipes for supplying a refrigerant or coolant to the heat pump system, the cooling means, and the battery cooling system inside an engine compartment becomes complicated.

In addition, since the battery cooling system for heating or cooling the battery is separately provided according to a state of the vehicle so that the battery may operate in an optimal state, a plurality of valves for connecting the respective connecting pipes are applied, thus noise and vibration are transmitted to the interior of the vehicle, resulting in poor ride comfort.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a heat pump system for a vehicle, which adjusts a temperature of a battery module by using one chiller that performs heat exchange between a refrigerant and a coolant and improves heating efficiency by recovering heat from various heat sources and using it for indoor heating.

An embodiment of the present disclosure provides a heat pump system for a vehicle, including: a cooling apparatus configured to include a radiator connected to a coolant line and a first water pump, and to circulate a coolant in the coolant line to cool at least one heating element provided in the coolant line, a battery cooling apparatus configured to include a second water pump connected to a battery coolant line and a battery module, and to circulate the coolant in the battery module, and a chiller connected to the battery cooling apparatus, and connected with a refrigerant line of an air conditioner apparatus through a refrigerant connection line, to adjust a temperature of the coolant by heat-exchanging the coolant circulated in the battery coolant line with a refrigerant selectively supplied from the air conditioner apparatus, wherein the air conditioner apparatus includes a main heat exchanger provided therein, which is connected to the coolant line, and condenses or evaporates the refrigerant through heat exchange with the coolant supplied through the coolant line depending on a cooling mode or at least one heating mode of the vehicle, the air conditioner apparatus further includes a bypass line connected to the refrigerant line through a refrigerant valve to selectively introduce the refrigerant that has passed through the main heat exchanger into a compressor, and the at least one heating mode is operated by selectively using the heating element, outside air, or waste heat of the battery module.

The air conditioner apparatus may further include: an internal condenser connected to the main heat exchanger through the refrigerant line, an evaporator connected to the main heat exchanger through the refrigerant line, a compressor connected between the evaporator through the refrigerant line; a first expansion valve provided in the refrigerant line to connect the main heat exchanger and the evaporator; a second expansion valve provided in the refrigerant connection line; and a third expansion valve provided in the refrigerant line between the internal condenser and the main heat exchanger.

The third expansion valve may expand the refrigerant that has passed through the internal condenser to supply it to the main heat exchanger in the at least one heating mode.

The air conditioner apparatus may further include a sub-heat exchanger provided in the refrigerant line between the main heat exchanger and the first expansion valve.

The sub-heat exchanger may further condense or evaporate the refrigerant condensed or evaporated in the main heat exchanger through heat exchange with outside air.

A first end of the refrigerant connection line may be connected to the refrigerant line between the subcondenser and the first expansion valve, and a second end of the refrigerant connection line may be connected to the refrigerant line between the evaporator and the compressor.

A first end of the bypass line may be connected to the refrigerant valve provided in the refrigerant line between the main heat exchanger and the sub-heat exchanger, and a second end of the bypass line may be connected to an accumulator provided in the refrigerant line between the evaporator and the compressor.

The cooling apparatus may further include a branch line connected to the coolant line between the radiator and the first water pump through a valve provided in the coolant line between the radiator and the first water pump.

When the battery module is cooled in the cooling mode of the vehicle, the coolant may be circulated in the coolant line by operating the first water pump in the cooling apparatus, the branch line may be closed through an operation of the valve, the coolant may be circulated in the battery coolant line by operating the second water pump in the battery cooling apparatus, the refrigerant line connected to the evaporator may be opened by operating the first expansion valve, the refrigerant connection line may be opened through an operation of the second expansion valve in the air conditioner device, and the bypass line may be closed through the operation of the refrigerant valve.

The at least one heating mode may include: a first heating mode that indirectly uses an outside heat source, a second heating mode that directly and indirectly uses an outside heat source, a third heating mode that directly uses an external heat source and uses waste heat of the heating element, and a fourth heating mode that uses a waste heat source of the heating element.

When the first heating mode operates, the coolant may be circulated in the coolant line by operating the first water pump in the cooling apparatus, the branch line may be closed through an operation of the valve, the refrigerant line connected to the evaporator may be closed by operating the first expansion valve in the air conditioner apparatus, the refrigerant connection line may be closed through an operation of the second expansion valve, the refrigerant line connecting the main heat exchanger and the evaporator may be closed through an operation of the refrigerant valve based on the refrigerant valve, and the bypass line may be opened through the operation of the refrigerant valve.

When the second heating mode operates, the coolant may be circulated in the coolant line by operating the first water pump in the cooling apparatus, the branch line may be closed through an operation of the valve, the refrigerant line connected to the evaporator may be closed by operating the first expansion valve in the air conditioner apparatus, the refrigerant connection line may be opened through an operation of the second expansion valve, the refrigerant line connecting the main heat exchanger and the refrigerant connection line may be opened through an operation of the refrigerant valve, and the bypass line may be opened through the operation of the refrigerant valve.

When the third heating mode operates, the coolant may be circulated in the coolant line by operating the first water pump in the cooling apparatus, the branch line may be opened through an operation of the valve, the coolant line connected to the first radiator may be closed through the operation of the valve based on the branch line, the refrigerant line connected to the evaporator may be closed by operating the first expansion valve in the air conditioner apparatus, the refrigerant connection line may be opened through an operation of the second expansion valve, the refrigerant line connecting the main heat exchanger and the refrigerant connection line may be opened through an operation of the refrigerant valve, and the bypass line may be opened through the operation of the refrigerant valve.

When the fourth heating mode operates, the coolant may be circulated in the coolant line by operating the first water pump in the cooling apparatus, the branch line may be opened through an operation of the valve, the coolant line connected to the first radiator may be closed through the operation of the valve based on the branch line, the refrigerant line connected to the evaporator may be closed by operating the first expansion valve in the air conditioner apparatus, the refrigerant connection line may be closed through an operation of the second expansion valve, the refrigerant line connecting the main heat exchanger and the evaporator may be closed through an operation of the refrigerant valve based on the refrigerant valve, and the bypass line may be opened through the operation of the refrigerant valve.

When the waste heat generated from the battery module is selectively recovered in the second heating mode and the third heating mode, the coolant may be circulated through the battery coolant line through the operation of the second water pump in the battery cooling apparatus.

In the third heating mode and the fourth heating mode, the valve may open the coolant line connected to the radiator to introduce some of the coolant that has passed through the main heat exchanger into the radiator, and the other coolant is introduced into the heating element when the heating element is overheated.

Each of the valve and the refrigerant valve may be a 3-way valve capable of distributing a fluid flow.

Each of the chiller and the main heat exchanger may be a water-cooled heat exchanger, and the sub-heat exchanger may be an air-cooled heat exchanger.

The heating element may include a power control device, an inverter, or an on-board charger (OBC), or a power conversion device, or an electrical component including an autonomous driving controller, or an oil cooler.

A described above, when the heat pump system for a vehicle according to the embodiment of the present disclosure is applied, the temperature of the battery module may be adjusted depending on the mode of the vehicle by using one chiller for performing heat exchange between the coolant and the refrigerant, and the interior of the vehicle may be heated by recovering heat from various heat sources, thereby simplifying the entire system.

In addition, according to the present disclosure, it is possible to improve heating efficiency by selectively recovering the waste heat generated from the external heat source, the heating element, or the battery module and using it for indoor heating in the at least one heating mode.

In addition, according to the present disclosure, it is possible to optimize the performance of the battery module by efficiently controlling the temperature of the battery module, and to increase an overall travel distance of the vehicle through efficient management of the battery module.

Further, the entire system may be simplified to reduce manufacturing cost and weight, and to improve space utilization.

DETAILED DESCRIPTION OF THE EMBODIMENTS

Figure 1:
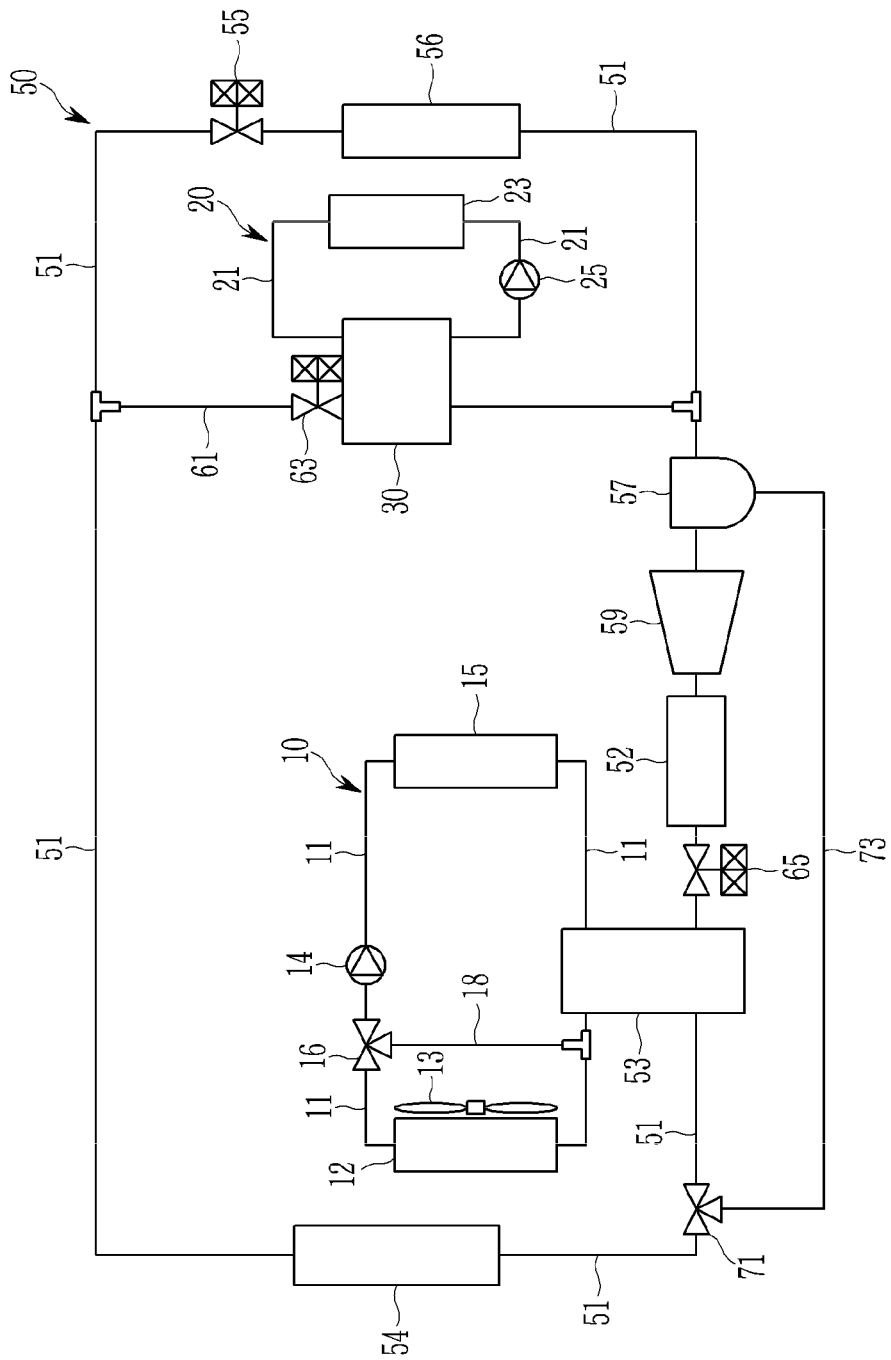
FIG. 1 illustrates a block diagram of a heat pump system for a vehicle according to an embodiment of the present disclosure.

An embodiment of the present disclosure will hereinafter be described in detail with reference to the accompanying drawings.

Since the embodiments described in the specification and the configurations shown in the drawings are merely the most preferable embodiments and configurations of the present disclosure, they do not represent all of the technical ideas of the present disclosure, and it should be understood that various equivalents and modified examples, which may replace the embodiments, are possible, when filing the present application.

In order to clearly describe the present disclosure, parts that are irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

In addition, throughout the specification, unless explicitly described to the contrary, the word "comprise" and variations such as "comprises" or "comprising" will be understood to imply the inclusion of stated elements but not the exclusion of any other elements.

Furthermore, terms such as "unit", "means", "part", and "member" described in the specification mean a unit of a comprehensive configuration having at least one function or operation.

FIG. 1 illustrates a block diagram of a heat pump system for a vehicle according to an embodiment of the present disclosure.

According to the present embodiment, the heat pump system may adjust a temperature of a battery module 23 by using one chiller 30 for performing heat exchange between a refrigerant and a coolant, and may recover heat from various heat sources to use it for interior heating.

Such a heat pump system may be applied to electric vehicles.

Referring to FIG. 1, the heat pump system may include a cooling apparatus 10, a battery cooling apparatus 20, and a chiller 30.

First, the cooling apparatus 10 includes a radiator 12, a first water pump 14, and a heating element 15, which are connected with each other through a coolant line 11.

The radiator 12 is disposed in the front of the vehicle, and a cooling fan 13 is disposed behind the radiator 12, so that the coolant is cooled through the operation of the cooling fan 13 and heat exchange with the outside air.

In addition, the heating element 15 may include an electric power control unit (EPCU), a motor, an inverter, or an on board charger (OBC), and an oil cooler connected to the motor.

The heating element 15 configured as described above may be provided in the coolant line 11 to be cooled in a water-cooled manner.

Accordingly, when the waste heat of the heating element 15 is recovered in the heating mode of the vehicle, the heat generated from the EPCU, the motor, the inverter, or the OBC may be recovered.

In addition, a reservoir tank (not illustrated) is provided in the coolant line 11 between the radiator 12 and the first water pump 14. The coolant cooled by the radiator 12 may be stored in the reservoir tank (not illustrated).

This cooling apparatus 10 may circulate the coolant in the coolant line 11 through the operation of the first water pump 14 such that the coolant is supplied to the heating element 15 provided in the coolant line 11.

Meanwhile, the cooling apparatus 10 may further include a branch line 18 connected to the coolant line 11 between the radiator 12 and the first water pump 14 through a valve 16 provided in the coolant line 11 between the radiator 12 and the first water pump 14.

A first end of the branch line 18 may be connected to the coolant line 11 through the valve 16, and a second end of the branch line 18 may be connected to the coolant line 11 connecting the heating element 15 and the radiator 12.

The branch line 18 is selectively opened through the operation of the valve 16 when a temperature of the coolant is increased by absorbing waste heat generated by the heating element 15. In this case, the coolant line 11 connected to the radiator 12 is closed through the operation of the valve 16.

In the present embodiment, the battery cooling apparatus 20 includes a battery coolant line 21, a battery module 23 connected to the battery coolant line 21, and a second water pump 25.

The battery cooling apparatus 20 may selectively circulate the coolant in the battery module 23 through the operation of the second water pump 25.

In the present embodiment, the chiller 30 is connected to the battery cooling apparatus 20 and the battery coolant line 21. That is, the chiller 30 is provided in the battery coolant line 21.

The chiller 30 is connected to a refrigerant line 51 of an air conditioner 50 through a refrigerant connection line 61. That is, the chiller 30 may be a water-cooled heat exchanger into which a coolant flows.

Accordingly, the chiller 30 may regulate the temperature of the coolant by performing heat exchange between the coolant that is selectively supplied to the battery coolant line 21 and the refrigerant that is selectively supplied from the air conditioner 50.

Herein, the first water pump 14 and the second water pump 25 may each be an electric water pump.

In the present embodiment, the air conditioner apparatus 50 includes an HVAC (heating, ventilation, and air conditioning) module (not illustrated), an internal condenser 52, a main heat exchanger 53, a sub-heat exchanger 54, a first expansion valve 55, an evaporator 56, a compressor 59, a second expansion valve 63, and a third expansion valve 65 connected through the refrigerant line 51.

First, the HVAC module includes the evaporator 56 connected therewith through the refrigerant line 51, and an opening and closing door (not illustrated) for controlling outside air passing through the evaporator 56 to selectively flow into the internal condenser 52 depending on a cooling mode, at least one heating mode, or a dehumidifying mode of the vehicle therein.

That is, the opening and closing door (not illustrated) is opened to enable the outside air passing through the evaporator 56 to be introduced into the internal condenser 52 in the heating mode of the vehicle.

In contrast, in the cooling mode of the vehicle, the opening and closing door (not illustrated) closes off the internal condenser 43 such that the outside air that is cooled while passing through the evaporator 56 directly flows into the vehicle.

Herein, the internal condenser 52 may condense the refrigerant supplied from the compressor 59 by heat-exchanging it with the outside air. The internal condenser 52 is connected to the main heat exchanger 53 through the refrigerant line 51.

In the present embodiment, the main heat exchanger 53 is connected to the refrigerant line 51 to enable the refrigerant to pass therethrough. This main heat exchanger 53 is provided in the coolant line 11 between the heating element 15 and the radiator 12 to enable the coolant circulating in the cooling apparatus 10 to pass therethrough.

That is, the main heat exchanger 53 may condense or evaporate the refrigerant through heat exchange with the coolant supplied through the coolant line 11 depending on a cooling mode or at least one heating mode of the vehicle.

The main heat exchanger 13 may be a water-cooled heat exchanger into which a coolant flows.

Herein, the at least one heating mode may be operated by selectively using the heating element 15, outside air, or waste heat of the battery module 23.

In the present embodiment, the sub-heat exchanger 54 may be provided in the refrigerant line 51 between the main heat exchanger 53 and the evaporator 56.

Herein, the sub-heat exchanger 54 may further condense or evaporate the refrigerant condensed or evaporated in the main heat exchanger 53 through heat exchange with the outside air. That is, the sub-heat exchanger 54 is disposed in front of the radiator 12 to heat-exchange the refrigerant introduced therein with the outside air.

As a result, the sub-heat exchanger 54 may be an air-cooled heat exchanger that condenses a refrigerant using outside air.

As such, when the main heat exchanger 53 condenses the refrigerant, the sub-heat exchanger 54 increases subcooling of the refrigerant by further condensing the refrigerant condensed in the main heat exchanger 53, thereby improving a coefficient of performance (COP), which is a coefficient of the cooling capacity relative to the power required by the compressor.

Conversely, when the main heat exchanger 53 evaporates the refrigerant, the sub-heat exchanger 54 may additionally evaporate the refrigerant evaporated in the main heat exchanger 53.

The first expansion valve 55 is provided in the refrigerant line 51 between the sub-heat exchanger 54 and the evaporator 56. The first expansion valve 55 receives the refrigerant passing through the sub-heat exchanger 54 to expand it.

In the present embodiment, the evaporator 56 may evaporate the refrigerant through heat exchange with outside air in the vehicle cooling mode. The outside air cooled while passing through the evaporator 56 may be introduced into a vehicle interior to cool the vehicle interior.

Herein, the air conditioner apparatus may further include an accumulator 57.

The accumulator 57 is provided in the refrigerant line 51 between the evaporator 56 and the compressor 59, and is connected to the refrigerant connection line 61.

The accumulator 57 improves efficiency and durability of the first compressor 59 by supplying only a gaseous refrigerant to the first compressor 59.

The compressor 59 is connected thereto between the evaporator 56 and the internal condenser 52 through the refrigerant line 51. This compressor 59 may compress the gaseous refrigerant and supply the compressed refrigerant to the internal condenser 52.

In the present embodiment, a first end of the refrigerant connection line 61 is connected to the refrigerant line 51 between the sub-heat exchanger 54 and the first expansion valve 55. A second end of the refrigerant connection line 61 may be connected to the refrigerant line 51 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 30 when the battery module 23 is cooled by the coolant heat-exchanged with the refrigerant.

That is, the second expansion valve 63 is operated to expand the refrigerant when the battery module 23 is cooled by using the coolant heat-exchanged with the refrigerant.

This second expansion valve 63 may introduce the refrigerant exhausted from the sub-heat exchanger 54 into the chiller 30 in a state where the temperature of the refrigerant is reduced by expanding the refrigerant, to further reduce the temperature of the coolant passing through the interior of the chiller 30.

As a result, the coolant having the reduced temperature while passing through the chiller 30 is introduced into the battery module 23, thereby being cooled more efficiently.

The third expansion valve 65 is provided in the refrigerant line 51 between the internal condenser 52 and the main heat exchanger 53.

Herein, the third expansion valve 65 may expand the refrigerant that has passed through the internal condenser 52 in the at least one heating mode to supply it to the main heat exchanger 53.

Accordingly, the main heat exchanger 53 may evaporate the refrigerant through heat exchange with the coolant supplied through the coolant line 11 in the at least one heating mode.

The air conditioner apparatus 50 that is configured in this way further includes a bypass line 73 connected thereto through the refrigerant line 51 and the refrigerant valve 71 to selectively introduce the refrigerant that has passed through the main heat exchanger 53 into the compressor 59.

A first end of the bypass line 73 is connected to the refrigerant valve 71 provided in the refrigerant line 51 between the main heat exchanger 53 and the sub-heat exchanger 54.

A second end of the bypass line 73 may be connected to the accumulator 57 provided in the refrigerant line 51 between the evaporator 56 and the compressor 59.

Herein, first, second, and third expansion valves 55, 63, and 65 may be electronic expansion valves that selectively expand the coolant while controlling a flow of the refrigerant through the coolant line 51 or the refrigerant connection line 61.

In addition, each of the valve 16 and the refrigerant valve 71 may be a three-way valve capable of distributing a fluid flow.

Meanwhile, in the present embodiment, the at least one heating mode may include first, second, third, and fourth heating modes.

First, the first heating mode may indirectly use an external heat source.

That is, in the first heating mode, the cooling apparatus 10 may recover the heat from the external air heat source while cooling the coolant in the radiator 12 through heat exchange with the outside air.

The recovered heat from the external heat source may be indirectly recovered through heat exchange between the refrigerant and the coolant in the main heat exchanger 53.

Accordingly, the first heating mode may heat the vehicle interior by indirectly using the external heat source.

In the present embodiment, the second heating mode may directly or indirectly use the external heat source.

That is, in the second heating mode, the cooling apparatus 10 may recover the heat from the external air heat source while cooling the coolant in the radiator 12 through heat exchange with the outside air.

In addition, the sub-heat exchanger 54 recovers the heat from the external heat source while evaporating the refrigerant through heat exchange with the external air.

The heat from the external heat source recovered from the cooling apparatus 10 is indirectly recovered through heat-exchange of the refrigerant and the coolant in the main heat exchanger 53. In addition, the sub-heat exchanger 54 may directly recover the heat from the external heat source through heat exchange between the refrigerant and the external air.

Accordingly, the second heating mode may heat the vehicle interior by directly and indirectly using the external heat source.

In the present embodiment, the third heating mode may directly use the external heat source, and may use waste heat of the heating element 15.

That is, in the third heating mode, the cooling apparatus 10 recovers the waste heat of the heating element 15 while cooling the heating element 15 using the coolant.

The coolant having a temperature that is increased while cooling the heating element 15 may be recovered through heat exchange with the refrigerant in the main heat exchanger 53 without passing through the radiator 12.

In addition, the sub-heat exchanger 54 directly recovers the heat from the external heat source while evaporating the refrigerant through heat exchange with the external air.

Accordingly, the third heating mode may directly use the external heat source, and may heat a vehicle interior using heat from a waste heat source of the heating element 15.

In addition, the fourth heating mode may use the waste heat source of the heating element 15.

That is, in the fourth heating mode, the cooling apparatus 10 recovers the waste heat of the heating element 15 while cooling the heating element 15 using the coolant.

The coolant having a temperature that is increased while cooling the heating element 15 may be recovered through heat exchange with the refrigerant in the main heat exchanger 53 without passing through the radiator 12.

Accordingly, in the fourth heating mode, the vehicle interior may be heated by using the waste heat source of the heating element 15.

In the meantime, when the waste heat generated from the battery module 23 is selectively recovered in the second heating mode and the third heating mode, the coolant may be circulated through the battery coolant line 21 through the operation of the second water pump 25 in the battery cooling apparatus 20.

In addition, when the heating element 15 is overheated in the third heating mode and the fourth heating mode, the coolant line 11 connected to the radiator 12 may be opened to introduce some of the coolant that has passed through the main heat exchanger 53 into the radiator 12, and the other coolant into the heating element 15.

Hereinafter, an operation and function of the heat pump system for a vehicle according to the embodiment of the present disclosure configured as described above will be described in detail with reference to FIG. 2 to FIG. 6.

In the present embodiment, an operation for cooling the battery module 23 in a cooling mode will be described with reference to FIG. 2.

Figure 2:
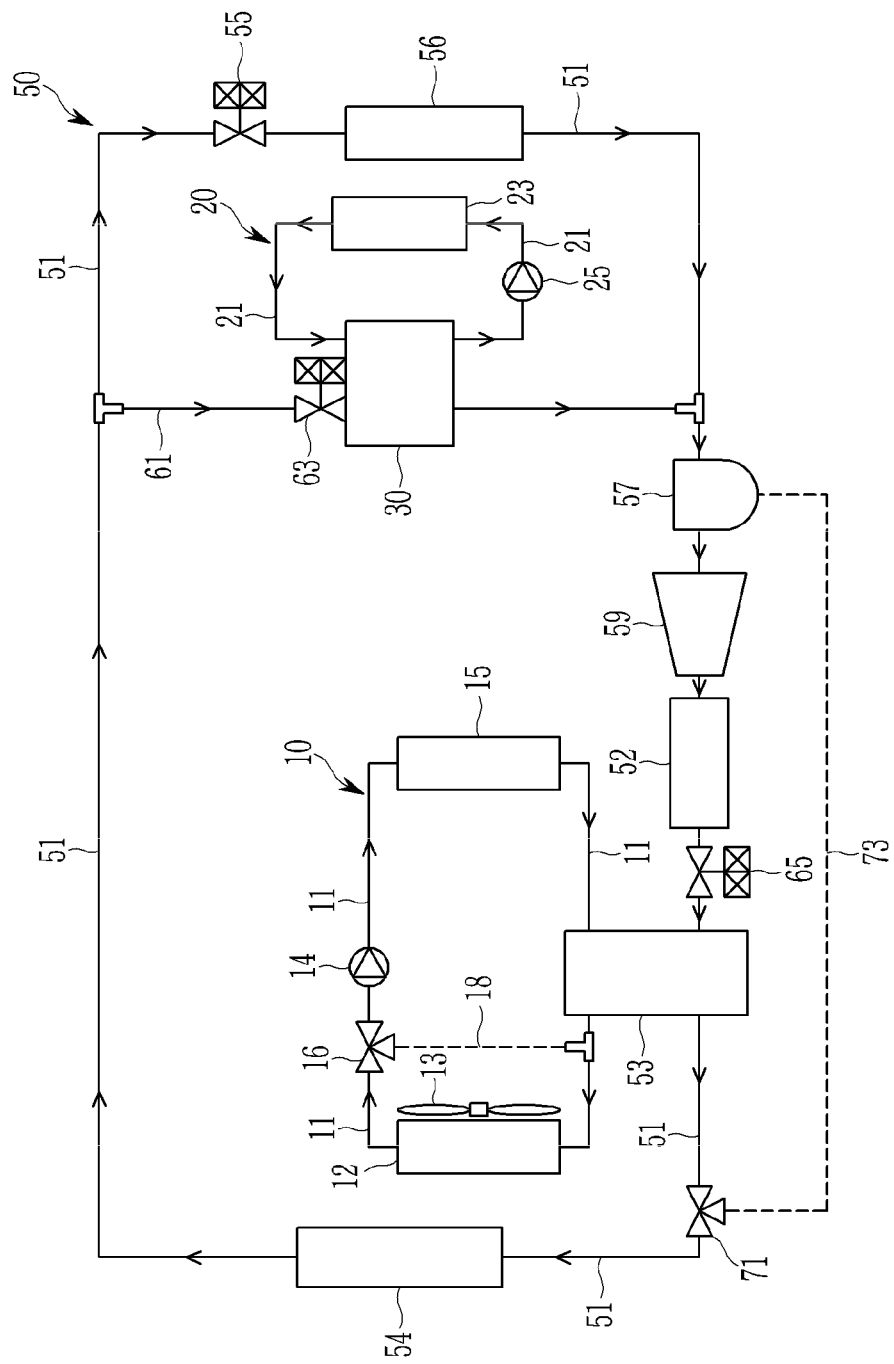
FIG. 2 illustrates an operational state diagram showing a cooling mode of a vehicle in a heat pump system for a vehicle according to an embodiment of the present disclosure.

FIG. 2 illustrates an operational state diagram showing a cooling mode of a vehicle in a heat pump system for a vehicle according to an embodiment of the present disclosure.

Referring to FIG. 2, in the cooling apparatus 10, the coolant is circulated in the coolant line 11 through the operation of the first water pump 14.

In this case, the branch line 18 is closed through the operation of the valve 16.

Accordingly, a coolant cooled by the radiator 12 may be circulated along the coolant line 11 through the operation of the first water pump 14 to cool the heating element 15.

The coolant that has passed through the heating element 15 may be supplied to the main heat exchanger 53 through the operation of the first water pump 14.

In this state, in the battery cooling apparatus 20, the second water pump 25 is operated to cool the battery module 24.

Then, in the battery cooling apparatus 20, the coolant may be circulated in the battery coolant line 21 by an operation of the second water pump 25.

Accordingly, in the battery cooling apparatus 20, the coolant that has passed through the chiller 30 through the operation of the second water pump 25 may be supplied to the battery module 23 along the battery coolant line 21.

In the air conditioner 50, each constituent element operates to cool the vehicle interior. Accordingly, the refrigerant is circulated along the refrigerant line 51.

Herein, the refrigerant line 51 connecting the sub-heat exchanger 54 and the evaporator 56 is opened through the operation of the first expansion valve 55. The refrigerant connection line 61 is opened through the operation of the second expansion valve 63.

A branch line 43 is closed through the operation of the refrigerant valve 71.

Then, the refrigerant that has passed through the main heat exchanger 53 flows into the sub-heat exchanger 54 along the refrigerant line 51. Thereafter, the refrigerant passing through the sub-heat exchanger 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 30, respectively.

In addition, the third expansion valve 65 may supply the refrigerant that has passed through the internal condenser 52 to the main heat exchanger 53 without expanding it.

Accordingly, the main heat exchanger 53 condenses the refrigerant by using the coolant flowing along the coolant line 11.

In addition, the sub-heat exchanger 54 may further condense the refrigerant flowing from the main heat exchanger 53 through heat exchange with the outside air.

In the meantime, the coolant passing through the chiller 30 circulates in the battery coolant line 21 to cool the battery module 23 through the operation of the second water pump 25.

The coolant passing through the chiller 30 is cooled through heat exchange with the expanded refrigerant that is supplied to the chiller 30. The coolant cooled in the chiller 30 is supplied to the battery module 23. Accordingly, the battery module 23 is cooled by the cooled coolant.

That is, the second expansion valve 63 expands some of the refrigerant that has passed through the sub-heat exchanger 54 to supply the expanded refrigerant to the chiller 30, and opens the refrigerant connection line 61.

Accordingly, some refrigerant discharged from the sub-heat exchanger 54 is expanded to enter a low-temperature and low-pressure state through the operation of the integrated control valve 63, and flows into the chiller 30 connected to the first connection line 61.

Thereafter, the refrigerant flowing into the first chiller 40 performs heat exchange with the coolant, and flows into the compressor 59 after passing through the refrigerant line 61 through the first connection line 61.

Accordingly, the coolant having the temperature that is raised while cooling the battery module 23 is cooled through the heat exchange with the low-temperature and low-pressure refrigerant inside the chiller 30. The cooled coolant is supplied back to battery module 23 along the battery coolant line 21.

As a result, the coolant circulated in the battery cooling apparatus 20 may efficiently cool the battery module 23 while repeating the above-described operation.

Meanwhile, the other refrigerant discharged from the sub-heat exchanger 54 flows through the refrigerant line 51 to cool the vehicle interior, and sequentially passes through the first expansion valve 55, the evaporator 56, the accumulator 57, the compressor 59, the internal condenser 52, and the main heat exchanger 53.

Herein, the outside air flowing into the HVAC module (not illustrated) is cooled while passing through the evaporator 56 by the low-temperature refrigerant flowing into the evaporator 56.

In this case, a portion of the internal condenser 52 through which the cooled outside air passes is closed by the opening and closing door (not illustrated) so that the outside air does not pass through the internal condenser 52. Accordingly, the cooled outside air directly flows into the vehicle interior, thereby cooling the vehicle interior.

In the meantime, the coolant having an amount of condensation that is increased while sequentially passing through the main heat exchanger 53 and the sub-heat exchanger 54 may be expanded and supplied to the evaporator 56, thereby allowing the refrigerant to be evaporated to a lower temperature.

As a result, in the present embodiment, the main heat exchanger 53 condenses the refrigerant, and the sub-heat exchanger 54 further condenses the refrigerant, which is advantageous in performing subcooling of the refrigerant.

In addition, as the refrigerant having undergone the subcooling is evaporated to a lower temperature in the evaporator 56, a temperature of the outside air passing through the evaporator 56 may be further lowered, thereby improving cooling performance and efficiency.

The refrigerant may cool the vehicle interior in the cooling mode of the vehicle while repeating the above-described processes, and at the same time, may cool the coolant through the heat exchange while passing through the chiller 30.

The low-temperature coolant cooled in the chiller 30 is introduced into the battery module 23. Accordingly, the battery module 23 may be efficiently cooled by the low-temperature coolant supplied therefrom.

Hereinafter, an operation of the first heating mode of the vehicle will be described with reference to FIG. 3.

Figure 3:
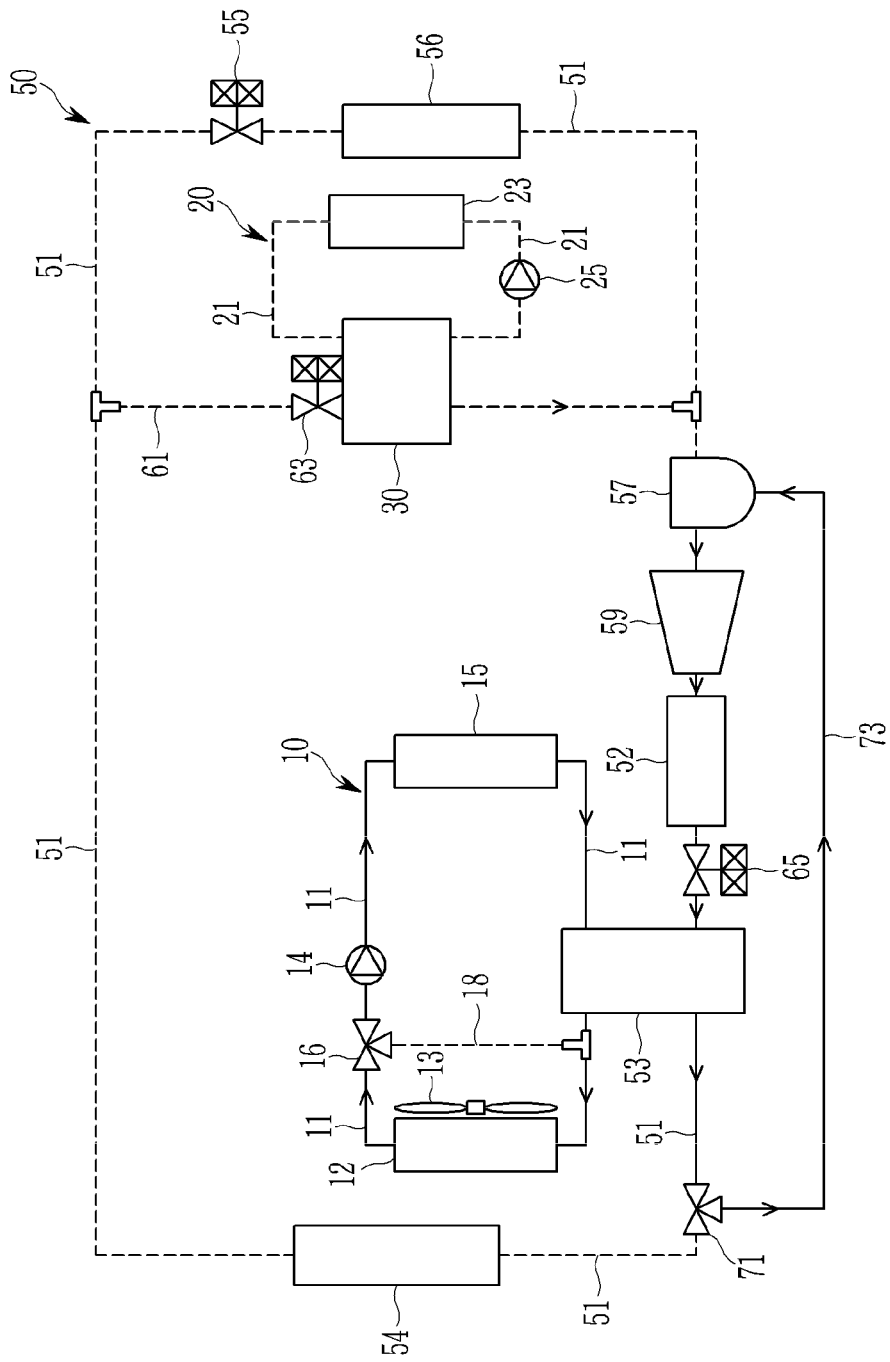
FIG. 3 illustrates an operational state diagram showing a first heating mode of a vehicle in a heat pump system for a vehicle according to an embodiment of the present disclosure.

FIG. 3 illustrates an operational state diagram showing a first heating mode of a vehicle in a heat pump system for a vehicle according to an embodiment of the present disclosure.

Referring to FIG. 3, the first heating mode may heat the vehicle interior by indirectly using the external heat source.

First, in the cooling apparatus 10, the first water pump 14 is operated for circulation of the coolant.

In this case, the branch line 18 is closed through the operation of the valve 16.

Accordingly, a coolant cooled by the radiator 12 may be circulated along the coolant line 11 through the operation of the first water pump 14 to cool the heating element 15.

The coolant that has passed through the heating element 15 may be supplied to the main heat exchanger 53 through the operation of the first water pump 14.

That is, in the first heating mode, the cooling apparatus 10 may recover the heat from the external air heat source while cooling the coolant in the radiator 12 through heat exchange with the outside air.

In the air conditioner 50, each constituent element operates to heat the vehicle interior. Accordingly, the refrigerant is circulated along the refrigerant line 51.

Herein, the refrigerant line 51 connected to the evaporator 56 is closed by the operation of the first expansion valve 55.

In addition, the refrigerant connection line 61 is closed through the operation of the second expansion valve 63.

At or around the same time, the refrigerant line 51 connecting the main heat exchanger 53, the sub-heat exchanger 54, and the evaporator 56 are closed through the operation of the refrigerant valve 71 based on the refrigerant valve 71.

The bypass line 73 may be opened through the operation of the refrigerant valve 73.

That is, the refrigerant compressed through the operation of the compressor 59 passes through the internal condenser 52 and then flows into the third expansion valve 65.

In this case, the third expansion valve 65 may expand the refrigerant supplied from the internal condenser 52 to supply it to the main heat exchanger 53.

The main heat exchanger 53 may evaporate the refrigerant supplied from the third expansion valve 65 through heat exchange with the coolant supplied through the coolant line 11.

The refrigerant evaporated in the main heat exchanger 53 is supplied to the accumulator 57 along the open bypass line 73.

The refrigerant supplied to the accumulator 57 is separated into a gas and a liquid, and among them, the gaseous refrigerant is supplied to the compressor 59. The refrigerant compressed in the compressor 59 is supplied to the internal condenser 52.

Herein, the heat from the external heat source recovered from the cooling apparatus 10 may be indirectly recovered through heat-exchange of the refrigerant and the coolant in the main heat exchanger 53.

Meanwhile, the opening and closing door (not illustrated) is opened to enable outside air flowing into the HVAC module (not illustrated) and passing through the evaporator 56 to pass through the internal condenser 52.

Accordingly, the outside air introduced from the outside flows in a room temperature state in which it is not cooled when passing through the evaporator 56 to which no refrigerant is supplied. The introduced outside air may be converted into a high temperature state while passing through the internal condenser 52, and flows into the vehicle, thereby heating the vehicle interior.

That is, the heat pump system according to the present embodiment may indirectly recover the heat from the external heat source recovered from the cooling apparatus 10 from the main heat exchanger 53 in the first heating mode of the vehicle and use it to increase a temperature of the refrigerant, thereby reducing power consumption of the compressor 59 and improving heating efficiency.

Hereinafter, an operation of the second heating mode of the vehicle will be described with reference to FIG. 4.

Figure 4:
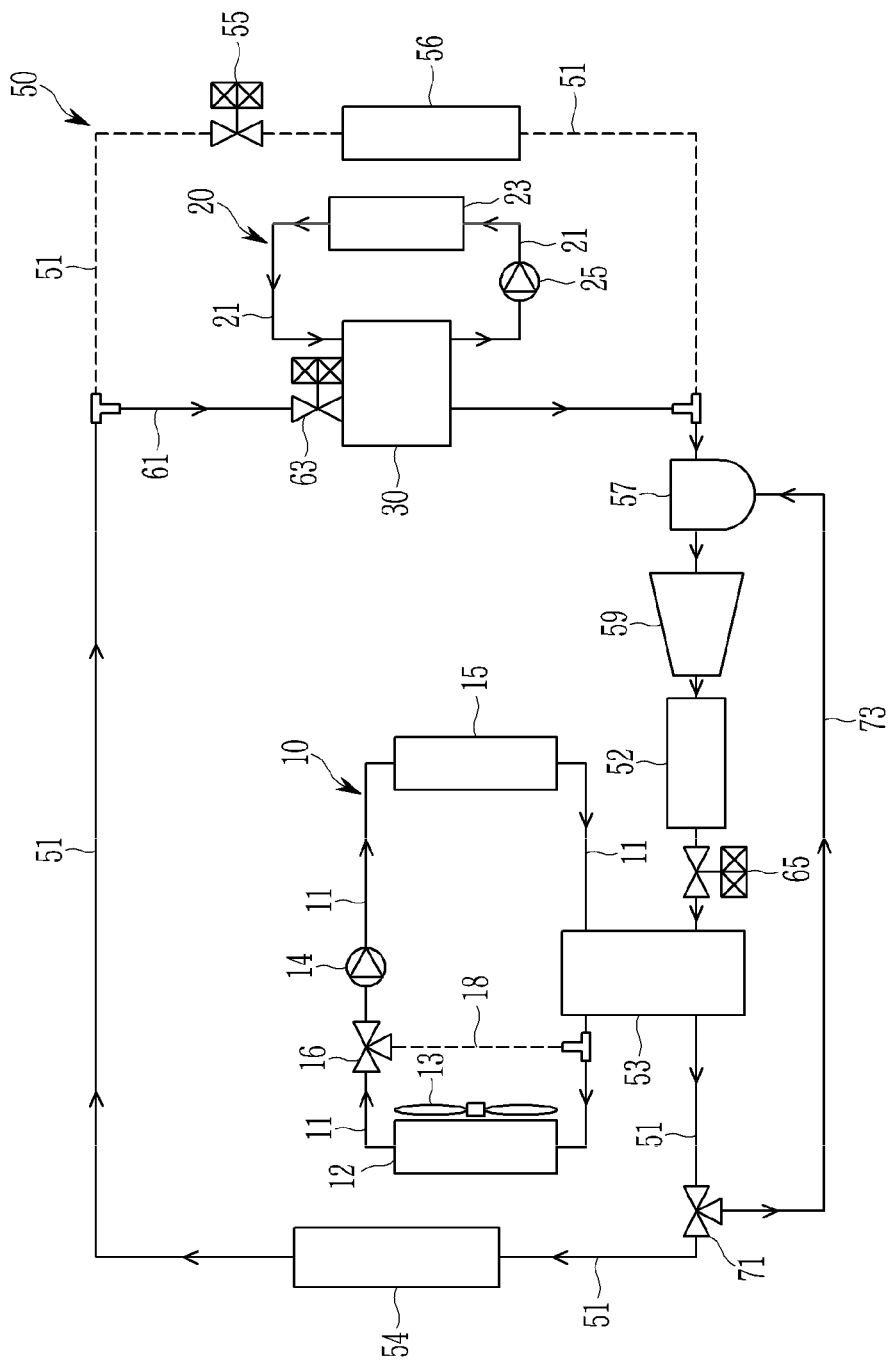
FIG. 4 illustrates an operational state diagram showing a second heating mode of a vehicle in a heat pump system for a vehicle according to an embodiment of the present disclosure.

FIG. 4 illustrates an operational state diagram showing a second heating mode of a vehicle in a heat pump system for a vehicle according to an embodiment of the present disclosure.

Referring to FIG. 4, the second heating mode may heat the vehicle interior by directly and indirectly using the external heat source.

First, in the cooling apparatus 10, the first water pump 14 is operated for circulation of the coolant.

In this case, the branch line 18 is closed through the operation of the valve 16.

Accordingly, a coolant cooled by the radiator 12 may be circulated along the coolant line 11 through the operation of the first water pump 14 to cool the heating element 15.

The coolant that has passed through the heating element 15 may be supplied to the main heat exchanger 53 through the operation of the first water pump 14.

That is, in the second heating mode, the cooling apparatus 10 may recover the heat from the external air heat source while cooling the coolant in the radiator 12 through heat exchange with the outside air.

In the air conditioner 50, each constituent element operates to heat the vehicle interior. Accordingly, the refrigerant is circulated along the refrigerant line 51.

Herein, the refrigerant line 51 connected to the evaporator 56 is closed by the operation of the first expansion valve 55.

Meanwhile, the refrigerant connection line 61 is opened through the operation of the second expansion valve 63.

At or around the same time, the refrigerant line 11 connecting the main heat exchanger 53 and the refrigerant connection line 61 is opened through the operation of the refrigerant valve 71.

A branch line 73 is opened through the operation of the refrigerant valve 71.

That is, the refrigerant compressed through the operation of the compressor 59 passes through the internal condenser 52 and then flows into the third expansion valve 65.

In this case, the third expansion valve 65 may expand the refrigerant supplied from the internal condenser 52 to supply it to the main heat exchanger 53.

The main heat exchanger 53 may evaporate the refrigerant supplied from the third expansion valve 65 through heat exchange with the coolant supplied through the coolant line 11.

Some of the refrigerant evaporated in the main heat exchanger 53 is supplied to the accumulator 57 along the open bypass line 73.

The refrigerant supplied to the accumulator 57 is separated into a gas and a liquid, and among them, the gaseous refrigerant is supplied to the compressor 59.

Herein, the heat from the external heat source recovered from the cooling apparatus 10 may be indirectly recovered through heat-exchange of the refrigerant and the coolant in the main heat exchanger 53.

Meanwhile, the other of the refrigerant evaporated in the main heat exchanger 53 is supplied to the sub-heat exchanger 54 along the open refrigerant line 51.

The sub-heat exchanger 54 may directly recover heat from an external heat source while further evaporating the supplied refrigerant through heat exchange with the external air.

The refrigerant that has passed through the sub-heat exchanger 54 may be supplied to the accumulator 57 after passing through the chiller 30 along the open refrigerant line 51 and the refrigerant connection line 61.

Herein, the second expansion valve 63 expands the refrigerant passing through the sub-heat exchanger 54 to supply the expanded refrigerant to the chiller 30, and opens the refrigerant connection line 61.

In the meantime, when the waste heat generated from the battery module 23 is selectively recovered in the second heating mode, the coolant may be circulated through the battery coolant line 21 through the operation of the second water pump 25 in the battery cooling apparatus 20.

Accordingly, the chiller 30 may recover waste heat generated in the battery module 23 through heat exchange between the refrigerant and the coolant having a temperature that is increased while cooling the battery module 23.

That is, the coolant passing through the chiller 30 is cooled through heat exchange with the expanded refrigerant that is supplied to the chiller 30. Accordingly, the chiller 30 may recover the waste heat generated in the battery module 23 through heat exchange between the refrigerant and the coolant having the temperature that is increased.

The refrigerant that has passed through the chiller 30 passes through the accumulator 57 through the refrigerant connection line 61, and then flows into the compressor 59. The refrigerant compressed in the compressor 59 is supplied to the internal condenser 52.

Meanwhile, the opening and closing door (not illustrated) is opened to enable outside air flowing into the HVAC module (not illustrated) and passing through the evaporator 56 to pass through the internal condenser 52.

Accordingly, the outside air introduced from the outside flows in a room temperature state in which it is not cooled when passing through the evaporator 56 to which no refrigerant is supplied. The introduced outside air may be converted into a high temperature state while passing through the internal condenser 52, and flows into the vehicle, thereby heating the vehicle interior.

That is, the heat pump system according to the present embodiment may indirectly recover the external heat source recovered from the cooling apparatus 10 from the main heat exchanger 53 in the second heating mode of the vehicle, and the sub-heat exchanger 54 may directly recover the heat from the external heat source to increase the temperature of the refrigerant.

In addition, the waste heat generated from the battery module 23 may be selectively recovered through the chiller 30 and may be used to increase the temperature of the refrigerant, thereby reducing power consumption of the compressor 59 and improving heating efficiency.

Hereinafter, an operation of the third heating mode of the vehicle will be described with reference to FIG. 5.

Figure 5:
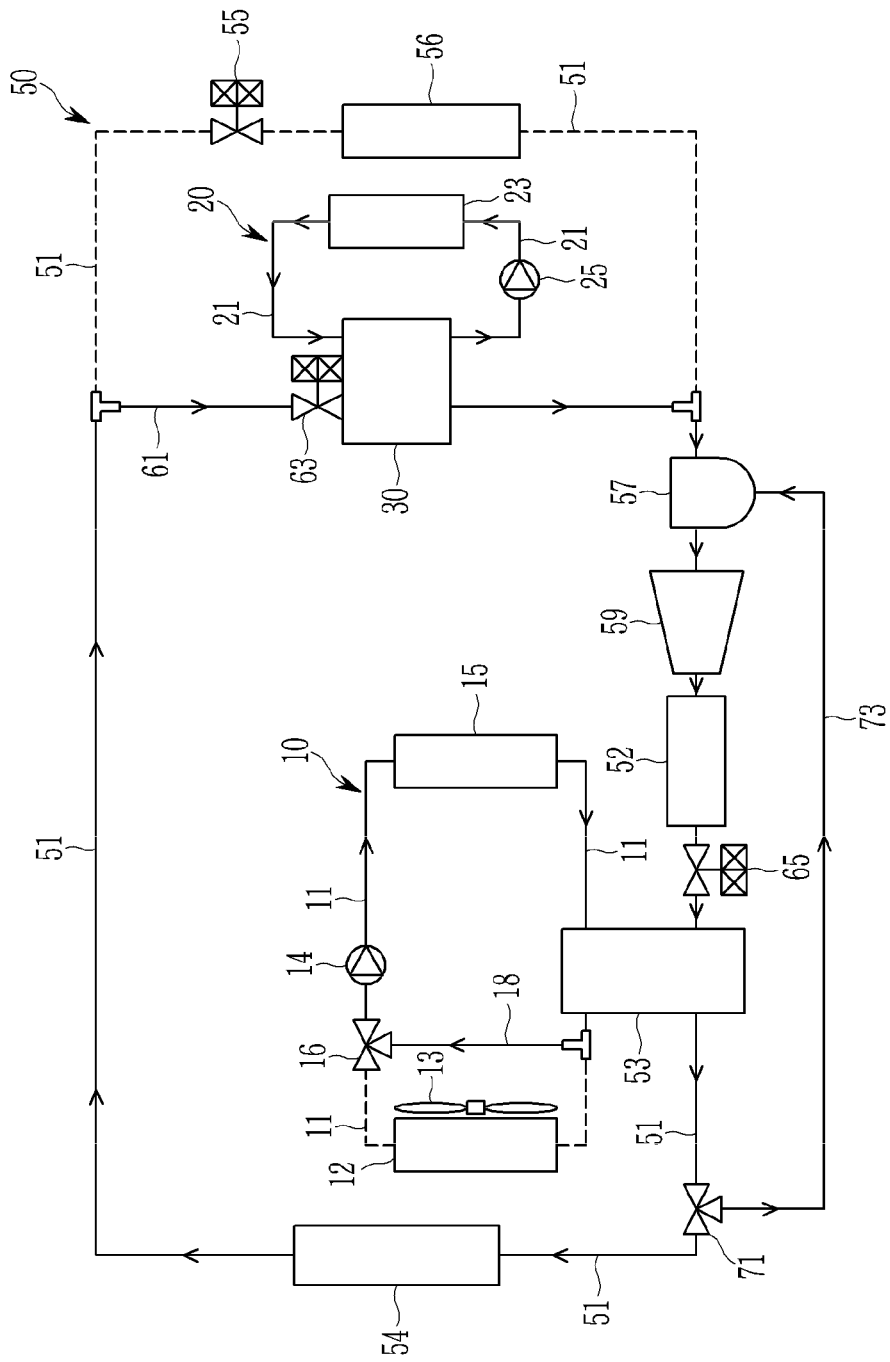
FIG. 5 illustrates an operational state diagram showing a third heating mode of a vehicle in a heat pump system for a vehicle according to an embodiment of the present disclosure.

FIG. 5 illustrates an operational state diagram showing a third heating mode of a vehicle in a heat pump system for a vehicle according to an embodiment of the present disclosure.

Referring to FIG. 5, the third heating mode may directly use the external heat source, and may heat a vehicle interior using heat from a waste heat source of the heating element 15.

First, in the cooling apparatus 10, the first water pump 14 is operated for circulation of the coolant.

In this case, the branch line 18 is opened through the operation of the valve 16.

At or around the same time, the valve 16 may close the coolant line 11 connecting the heating element 15 and the radiator 12.

That is, the coolant line 11 connected to the first radiator 12 is closed through the operation of the valve 16 based on the branch line 18.

Accordingly, the coolant passing through the heating element 15 continues to circulate along the coolant line 11 without passing through the radiator 12, and absorbs the waste heat from the heating element 15 to increase a temperature thereof.

The coolant having an increased temperature may be supplied to the main heat exchanger 53.

That is, the waste heat generated by the heating element 15 increases the temperature of the coolant circulating in the coolant line 11.

The heat from the coolant having the increased temperature may be recovered while increasing the temperature of the refrigerant discharged from the main heat exchanger 53, while passing through the main heat exchanger 53 through the operation of the first water pump 14.

In the air conditioner 50, each constituent element operates to heat the vehicle interior. Accordingly, the refrigerant is circulated along the refrigerant line 51.

Herein, the refrigerant line 51 connected to the evaporator 56 is closed by the operation of the first expansion valve 55.

Meanwhile, the refrigerant connection line 61 is opened through the operation of the second expansion valve 63.

At or around the same time, the refrigerant line 11 connecting the main heat exchanger 53 and the refrigerant connection line 61 is opened through the operation of the refrigerant valve 71.

A branch line 73 is opened through the operation of the refrigerant valve 71.

That is, the refrigerant compressed through the operation of the compressor 59 passes through the internal condenser 52 and then flows into the third expansion valve 65.

In this case, the third expansion valve 65 may expand the refrigerant supplied from the internal condenser 52 to supply it to the main heat exchanger 53.

The main heat exchanger 53 may evaporate the refrigerant supplied from the third expansion valve 65 through heat exchange with the coolant having the temperature that is increased by the waste heat of the heating element 15.

Accordingly, the main heat exchanger 53 may smoothly recover the waste heat of the heating element 15.

Some of the refrigerant evaporated in the main heat exchanger 53 is supplied to the accumulator 57 along the open bypass line 73.

The refrigerant supplied to the accumulator 57 is separated into a gas and a liquid, and among them, the gaseous refrigerant is supplied to the compressor 59.

Meanwhile, the other of the refrigerant evaporated in the main heat exchanger 53 is supplied to the sub-heat exchanger 54 along the open refrigerant line 51.

The sub-heat exchanger 54 may directly recover heat from the external heat source while further evaporating the supplied refrigerant through heat exchange with the external air.

The refrigerant that has passed through the sub-heat exchanger 54 may be supplied to the accumulator 57 after passing through the chiller 30 along the open refrigerant line 51 and the refrigerant connection line 61.

Herein, the second expansion valve 63 expands the refrigerant passing through the sub-heat exchanger 54 to supply the expanded refrigerant to the chiller 30, and opens the refrigerant connection line 61.

In the meantime, when the waste heat generated from the battery module 23 is selectively recovered in the second heating mode, the coolant may be circulated through the battery coolant line 21 through the operation of the second water pump 25 in the battery cooling apparatus 20.

Accordingly, the chiller 30 may recover waste heat generated in the battery module 23 through heat exchange between the refrigerant and the coolant having a temperature that is increased while cooling the battery module 23.

That is, the coolant passing through the chiller 30 is cooled through heat exchange with the expanded refrigerant that is supplied to the chiller 30. Accordingly, the chiller 30 may recover the waste heat generated in the battery module 23 through heat exchange between the refrigerant and the coolant having the temperature that is increased.

The refrigerant that has passed through the chiller 30 passes through the accumulator 57 through the refrigerant connection line 61, and then flows into the compressor 59. The refrigerant compressed in the compressor 59 is supplied to the internal condenser 52.

Meanwhile, the opening and closing door (not illustrated) is opened to enable outside air flowing into the HVAC module (not illustrated) and passing through the evaporator 56 to pass through the internal condenser 52.

Accordingly, the outside air introduced from the outside flows in a room temperature state in which it is not cooled when passing through the evaporator 56 to which no refrigerant is supplied. The introduced outside air may be converted into a high temperature state while passing through the internal condenser 52, and flows into the vehicle, thereby heating the vehicle interior.

That is, the heat pump system according to the present embodiment may recover the heat from the external heat source generated from the heating element 15 from the main heat exchanger 53 in the third heating mode of the vehicle, and the sub-heat exchanger 54 may directly recover the heat from the external heat source to increase the temperature of the refrigerant.

In addition, the waste heat generated from the battery module 23 may be selectively recovered through the chiller 30 and may be used to increase the temperature of the refrigerant, thereby reducing power consumption of the compressor 59 and improving heating efficiency.

In the meantime, when the heating element 15 is overheated while the third heating mode operates, the coolant line 11 connected to the radiator 12 is opened through the operation of the valve 16.

Herein, the branch line 18 may maintain an open state thereof.

Accordingly, some coolant that does not flow into the branch line 18 is cooled as it passes through the radiator 12.

The coolant that has been completely cooled may recover waste heat while passing through the heating element 15 together with the cooling water circulating along the branch line 18, and may simultaneously and efficiently cool the heating element 15.

That is, when the heating element 15 is overheated, the valve 16 may open the coolant line 11 connected to the radiator 12 to enable some of the coolant that has passed through the heating element 15 to pass into the branch line 18 and the other coolant into the radiator 12.

As a result, some coolant cooled in the radiator 12 may be supplied to the heating element 15, thereby preventing the heating element 15 from overheating.

That is, according to the present disclosure, it is possible to recover the waste heat generated in the heating element 15, and use the waste heat for interior heating, thereby reducing power consumption and improving overall heating efficiency.

At the same time, according to the present disclosure, some coolant may be introduced into the radiator 12 through operation control of the valve 16 capable of distributing the fluid flow, to be cooled, and then to be supplied to the heating element 15, thereby efficiently cooling the heating element 15 and ensuring the cooling performance of the heating element 15.

Hereinafter, an operation of the fourth heating mode of the vehicle will be described with reference to FIG. 6.

Figure 6:
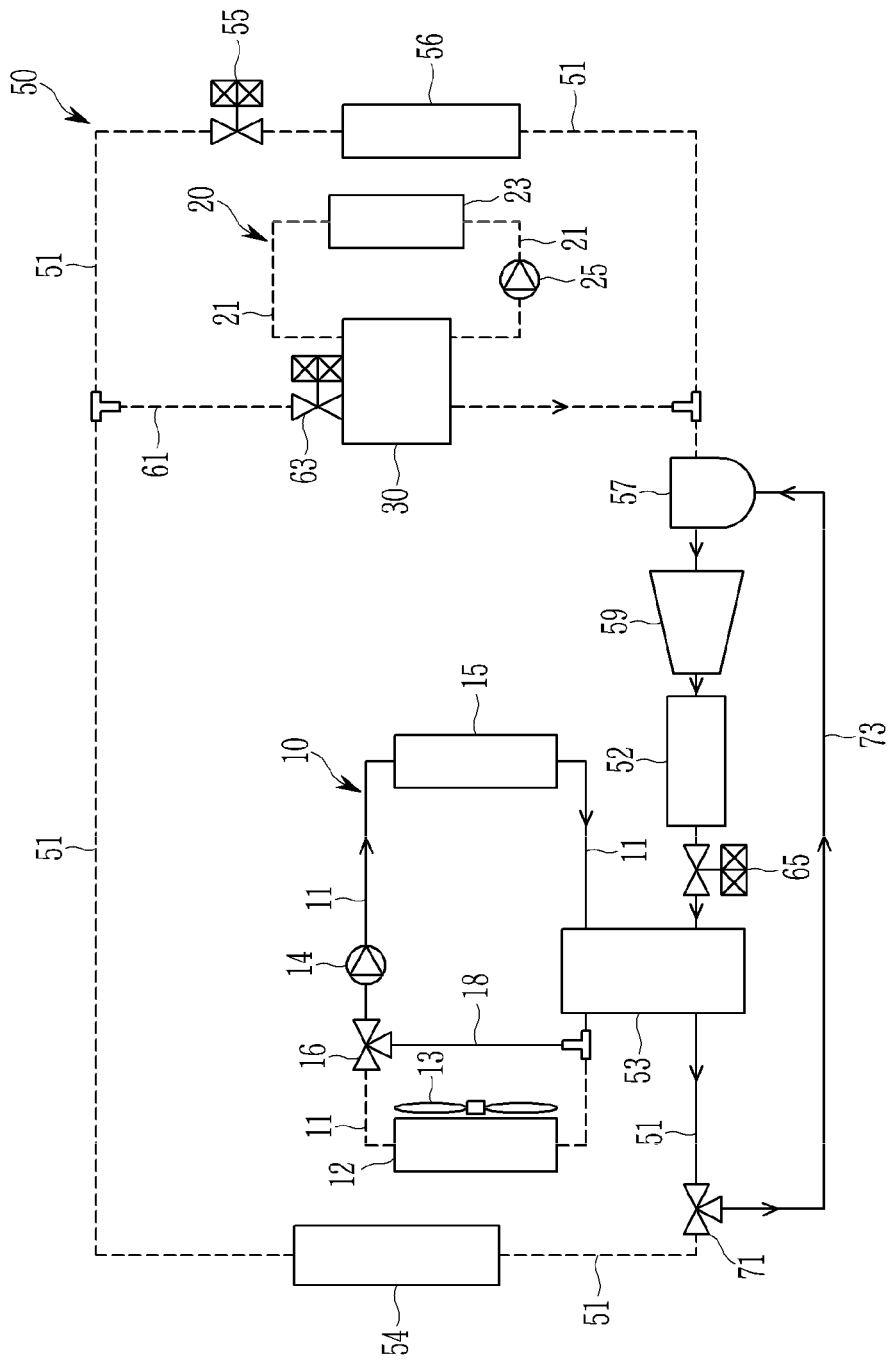
FIG. 6 illustrates an operational state diagram showing a fourth heating mode of a vehicle in a heat pump system for a vehicle according to an embodiment of the present disclosure.

FIG. 6 illustrates an operational state diagram showing a fourth heating mode of a vehicle in a heat pump system for a vehicle according to an embodiment of the present disclosure.

Referring to FIG. 6, in the fourth heating mode, the vehicle interior may be heated by using the waste heat of the heating element 15.

First, in the cooling apparatus 10, the first water pump 14 is operated for circulation of the coolant.

In this case, the branch line 18 is opened through the operation of the valve 16.

At or around the same time, the valve 16 may close the coolant line 11 connecting the heating element 15 and the radiator 12.

That is, the coolant line 11 connected to the first radiator 12 is closed through the operation of the valve 16 based on the branch line 18.

Accordingly, the coolant passing through the heating element 15 continues to circulate along the coolant line 11 without passing through the radiator 12, and absorbs the waste heat from the heating element 15 to increase a temperature thereof.

The coolant having an increased temperature may be supplied to the main heat exchanger 53.

That is, the waste heat generated by the heating element 15 increases the temperature of the coolant circulating in the coolant line 11.

The heat from the coolant having the increased temperature may be recovered while increasing the temperature of the refrigerant discharged from the main heat exchanger 53, while passing through the main heat exchanger 53 through the operation of the first water pump 14.

In the air conditioner 50, each constituent element operates to heat the vehicle interior. Accordingly, the refrigerant is circulated along the refrigerant line 51.

Herein, the refrigerant line 51 connected to the evaporator 56 is closed by the operation of the first expansion valve 55.

In addition, the refrigerant connection line 61 is closed through the operation of the second expansion valve 63.

At or around the same time, the refrigerant line 51 connecting the main heat exchanger 53, the sub-heat exchanger 54, and the evaporator 56 are closed through the operation of the refrigerant valve 71.

The bypass line 73 may be opened through the operation of the refrigerant valve 71.

That is, the refrigerant compressed through the operation of the compressor 59 passes through the internal condenser 52 and then flows into the third expansion valve 65.

In this case, the third expansion valve 65 may expand the refrigerant supplied from the internal condenser 52 to supply it to the main heat exchanger 53.

The main heat exchanger 53 may evaporate the refrigerant supplied from the third expansion valve 65 through heat exchange with the coolant having the temperature that is increased by the waste heat of the heating element 15.

Accordingly, the main heat exchanger 53 may smoothly recover the waste heat of the heating element 15.

The refrigerant evaporated in the main heat exchanger 53 is supplied to the accumulator 57 along the open bypass line 73.

The refrigerant supplied to the accumulator 57 is separated into a gas and a liquid, and among them, the gaseous refrigerant is introduced into the compressor 59.

The refrigerant compressed in the compressor 59 is supplied to the internal condenser 52.

Meanwhile, the opening and closing door (not illustrated) is opened to enable outside air flowing into the HVAC module (not illustrated) and passing through the evaporator 56 to pass through the internal condenser 52.

Accordingly, the outside air introduced from the outside flows in a room temperature state in which it is not cooled when passing through the evaporator 56 to which no refrigerant is supplied. The introduced outside air may be converted into a high temperature state while passing through the internal condenser 52, and flows into the vehicle, thereby heating the vehicle interior.

That is, the heat pump system according to the present embodiment may recover the waste heat generated from the heating element 15 from the main heat exchanger 53 in the fourth heating mode of the vehicle and use it to increase a temperature of the refrigerant, thereby reducing power consumption of the compressor 59 and improving heating efficiency.

In the meantime, when the heating element 15 is overheated while the fourth heating mode operates, the coolant line 11 connected to the radiator 12 is opened through operation of the valve 16.

Herein, the branch line 18 may maintain an open state thereof.

Accordingly, some coolant that does not flow into the branch line 18 is cooled as it passes through the radiator 12.

The coolant that has been completely cooled may recover waste heat while passing through the heating element 15 together with the cooling water circulating along the branch line 18, and may simultaneously and efficiently cool the heating element 15.

That is, when the heating element 15 is overheated, the valve 16 may open the coolant line 11 connected to the radiator 12 to enable some of the coolant that has passed through the heating element 15 into the branch line 18 and the other coolant into the radiator 12.

As a result, some coolant cooled in the radiator 12 may be supplied to the heating element 15, thereby preventing the heating element 15 from overheating.

That is, according to the present disclosure, it is possible to recover the waste heat generated in the heating element 15, and use the waste heat for interior heating, thereby reducing power consumption and improving overall heating efficiency.

At the same time, according to the present disclosure, some coolant may be introduced into the radiator 12 through operation control of the valve 16 capable of distributing the fluid flow, to be cooled, and then to be supplied to the heating element 15, thereby efficiently cooling the heating element 15 and ensuring the cooling performance of the heating element 15.

Therefore, as described above, when the heat pump system for a vehicle according to the embodiment of the present disclosure is applied, the temperature of the battery module 23 may be adjusted depending on the mode of the vehicle by using one chiller 30 for performing heat exchange between the coolant and the refrigerant, and the interior of the vehicle may be heated by recovering heat from the various heat sources, thereby simplifying the entire system.

In addition, according to the present disclosure, it is possible to improve heating efficiency by selectively recovering the waste heat generated from the external heat source, the heating element 15, or the battery module 23 and using it for indoor heating in the first, second, third, and fourth heating modes.

In addition, according to the present disclosure, it is possible to optimize the performance of the battery module 23 by efficiently controlling the temperature of the battery module 23, and to increase an overall travel distance of the vehicle through efficient management of the battery module 23.

Further, the entire system may be simplified to reduce manufacturing cost and weight, and to improve space utilization.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A heat pump system for a vehicle, comprising:
   a cooling apparatus configured to include a radiator connected to a coolant line and a first water pump, and to circulate a coolant in the coolant line to cool at least one heating element provided in the coolant line;
   a battery cooling apparatus configured to include a second water pump connected to a battery coolant line and a battery module, and to circulate the coolant in the battery module; and
   a chiller connected to the battery cooling apparatus, and connected with a refrigerant line of an air conditioner apparatus through a refrigerant connection line, to adjust a temperature of the coolant by heat-exchanging the coolant circulated in the battery coolant line with a refrigerant selectively supplied from the air conditioner apparatus,
   wherein the air conditioner apparatus includes a main heat exchanger, which is connected to the coolant line, and condenses or evaporates the refrigerant through heat exchange with the coolant supplied through the coolant line depending on a cooling mode or at least one heating mode of the vehicle,
   the air conditioner apparatus further includes a bypass line connected to the refrigerant line through a refrigerant valve to selectively introduce the refrigerant that has passed through the main heat exchanger into a compressor, and
   the at least one heating mode is operated by selectively using the heating element, outside air, or waste heat of the battery module.

2. The heat pump system of claim 1, wherein the air conditioner apparatus further includes:
   an internal condenser connected to the main heat exchanger through the refrigerant line;
   an evaporator connected to the main heat exchanger through the refrigerant line;
   a compressor connected between the evaporator through the refrigerant line;
   a first expansion valve provided in the refrigerant line to connect the main heat exchanger and the evaporator;
   a second expansion valve provided in the refrigerant connection line; and a third expansion valve provided in the refrigerant line between the internal condenser and the main heat exchanger.

3. The heat pump system of claim 2, wherein
   the third expansion valve expands the refrigerant that has passed through the internal condenser to supply it to the main heat exchanger in the at least one heating mode.

4. The heat pump system of claim 2, wherein
   the air conditioner apparatus further includes a sub-heat exchanger provided in the refrigerant line between the main heat exchanger and the first expansion valve.

5. The heat pump system of claim 4, wherein
   the sub-heat exchanger further condenses or evaporates the refrigerant condensed or evaporated in the main heat exchanger through heat exchange with outside air.

6. The heat pump system of claim 4, wherein
   a first end of the refrigerant connection line is connected to the refrigerant line between the subcondenser and the first expansion valve, and
   a second end of the refrigerant connection line is connected to the refrigerant line between the evaporator and the compressor.

7. The heat pump system of claim 4, wherein
   a first end of the bypass line is connected to the refrigerant valve provided in the refrigerant line between the main heat exchanger and the sub-heat exchanger, and
   a second end of the bypass line is connected to an accumulator provided in the refrigerant line between the evaporator and the compressor.

8. The heat pump system of claim 4, wherein
   each of the chiller and the main heat exchanger is a water-cooled heat exchanger, and the sub-heat exchanger is an air-cooled heat exchanger.

9. The heat pump system of claim 2, wherein
the cooling apparatus further includes a branch line connected to the coolant line between the radiator and the first water pump through a valve provided in the coolant line between the radiator and the first water pump.

10. The heat pump system of claim 9, wherein,
when the battery module is cooled in the cooling mode of the vehicle,
the coolant is circulated in the coolant line by operating the first water pump in the cooling apparatus,
the branch line is closed through an operation of the valve,
the coolant is circulated in the battery coolant line by operating the second water pump in the battery cooling apparatus,
the refrigerant line connected to the evaporator is opened by operating the first expansion valve, and the refrigerant connection line is opened through an operation of the second expansion valve in the air conditioner device, and
the bypass line is closed through an operation of the refrigerant valve.

11. The heat pump system of claim 9, wherein the at least one heating mode includes:
a first heating mode that indirectly uses an outside heat source;
a second heating mode that directly and indirectly uses an outside heat source;
a third heating mode that directly uses an external heat source and uses waste heat of the heating element; and
a fourth heating mode that uses a waste heat source of the heating element.

12. The heat pump system of claim 11, wherein,
when the first heating mode operates,
the coolant is circulated in the coolant line by operating the first water pump in the cooling apparatus,
the branch line is closed through an operation of the valve,
the refrigerant line connected to the evaporator is closed by operating the first expansion valve in the air conditioner apparatus,
the refrigerant connection line is closed through an operation of the second expansion valve,
the refrigerant line connecting the main heat exchanger and the evaporator is closed through an operation of the refrigerant valve based on the refrigerant valve, and
the bypass line is opened through an operation of the refrigerant valve.

13. The heat pump system of claim 11, wherein when the second heating mode operates,
the coolant is circulated in the coolant line by operating the first water pump in the cooling apparatus,
the branch line is closed through an operation of the valve,
the refrigerant line connected to the evaporator is closed by operating the first expansion valve, and the refrigerant connection line is opened through an operation of the second expansion valve in the air conditioner device,
the refrigerant line connecting the main heat exchanger and the refrigerant connection line is opened through an operation of the refrigerant valve, and
the bypass line is opened through an operation of the refrigerant valve.

14. The heat pump system of claim 11, wherein when the third heating mode operates,
the coolant is circulated in the coolant line by operating the first water pump in the cooling apparatus,
the branch line is opened through an operation of the valve,
the coolant line connected to the first radiator is closed through the operation of the valve based on the branch line,
the refrigerant line connected to the evaporator is closed by operating the first expansion valve, and the refrigerant connection line is opened through an operation of the second expansion valve in the air conditioner device,
the refrigerant line connecting the main heat exchanger and the refrigerant connection line is opened through an operation of the refrigerant valve, and
the bypass line is opened through an operation of the refrigerant valve.

15. The heat pump system of claim 11, wherein when the fourth heating mode operates,
the coolant is circulated in the coolant line by operating the first water pump in the cooling apparatus,
the branch line is opened through an operation of the valve,
the coolant line connected to the first radiator is closed through the operation of the valve based on the branch line,
the refrigerant line connected to the evaporator is closed by operating the first expansion valve in the air conditioner apparatus,
the refrigerant connection line is closed through an operation of the second expansion valve,
the refrigerant line connecting the main heat exchanger and the evaporator is closed through an operation of the refrigerant valve based on the refrigerant valve, and
the bypass line is opened through an operation of the refrigerant valve.

16. The heat pump system of claim 11, wherein,
when the waste heat generated from the battery module is selectively recovered in the second heating mode and the third heating mode,
the coolant is circulated through the battery coolant line through the operation of the second water pump in the battery cooling apparatus.

17. The heat pump system of claim 11, wherein,
in the third heating mode and the fourth heating mode, the valve
opens the coolant line connected to the radiator to introduce some of the coolant that has passed through the main heat exchanger into the radiator and the other coolant is introduced into the heating element when the heating element is overheated.

18. The heat pump system of claim 9, wherein
each of the valve and the refrigerant valve
is a three-way valve capable of distributing a fluid flow.

19. The heat pump system of claim 1, wherein the heating element
includes a power control device, an inverter, or an on-board charger (OBC), or a power conversion device, or an electrical component including an autonomous driving controller, or an oil cooler.

* * * * *